P. F. JOHANSON.
DUMPING RAKE.
APPLICATION FILED JULY 2, 1912.

1,055,466.

Patented Mar. 11, 1913.

2 SHEETS—SHEET 1.

Witnesses
Wm. H. Mulligan
C. C. Hines

Inventor
Peter F. Johanson.
By Victor J. Evans
Attorney

P. F. JOHANSON.
DUMPING RAKE.
APPLICATION FILED JULY 2, 1912.

1,055,466.

Patented Mar. 11, 1913.

2 SHEETS—SHEET 2.

Witnesses
Wm. H. Mulligan.

Inventor
Peter F. Johanson.
By Victor J. Evans.
Attorney

UNITED STATES PATENT OFFICE.

PETER F. JOHANSON, OF SAN JOSE, CALIFORNIA.

DUMPING-RAKE.

1,055,466.  Specification of Letters Patent.  Patented Mar. 11, 1913.

Application filed July 2, 1912. Serial No. 707,341.

*To all whom it may concern:*

Be it known that I, PETER F. JOHANSON, a citizen of the United States, residing at San Jose, in the county of Santa Clara and State of Californa, have invented new and useful Improvements in Dumping-Rakes, of which the following is a specification.

This invention relates to dumping attachments for rakes, the primary object of the invention being to provide simple and effective foot-controlled means for automatically adjusting the rake to dumping position.

A further object of the invention is to provide simple and effective means for locking the dumping mechanism in normal position, which means is adapted to be retracted by foot power mechanism.

The invention consists of the features of construction, combination and arrangement of parts hereinafter fully described and claimed, reference being had to the accompanying drawings, in which:—

Figure 1:
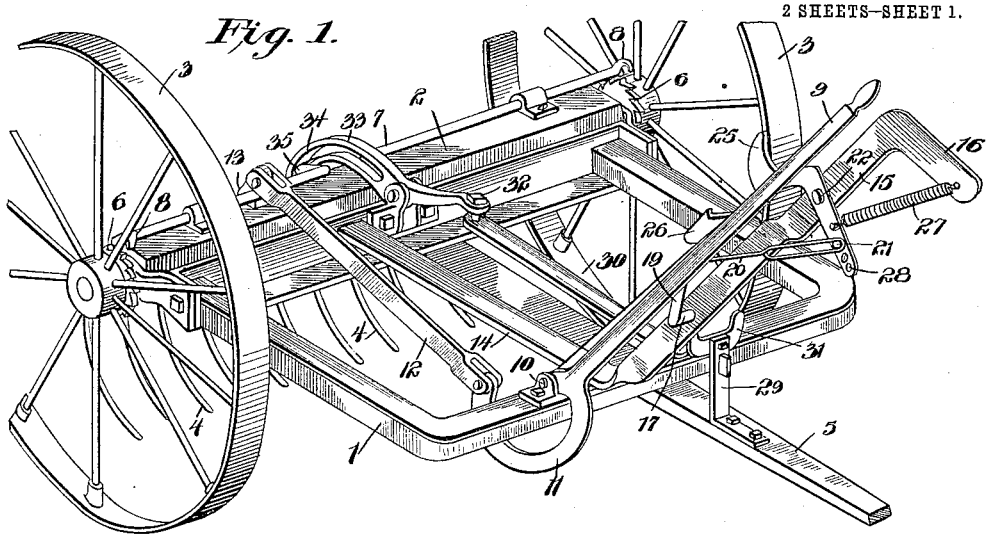
Figure 2:
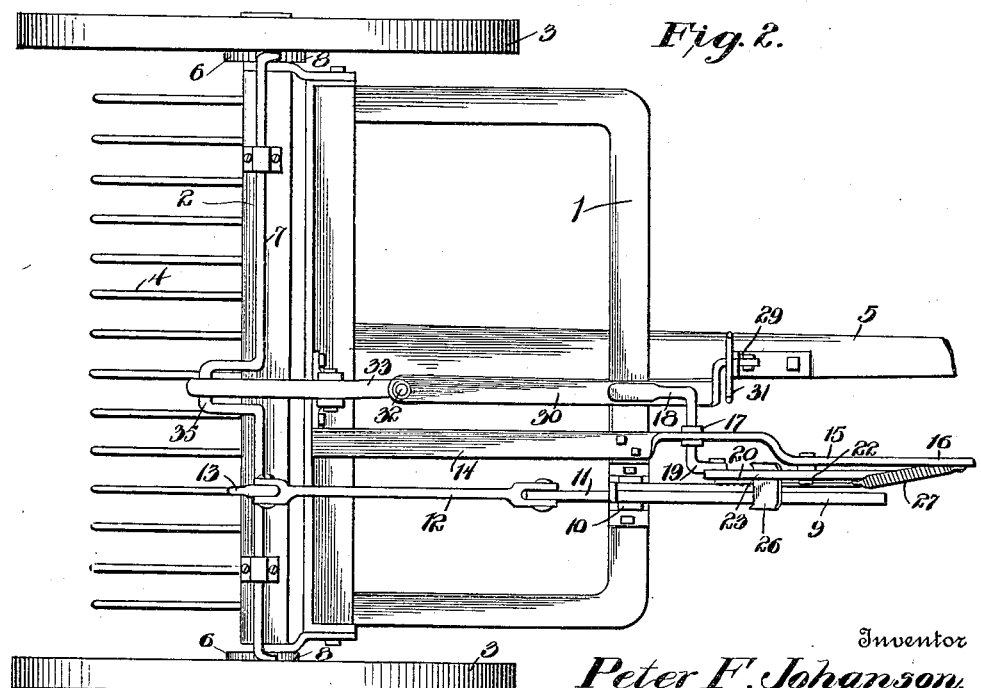
Figure 3:
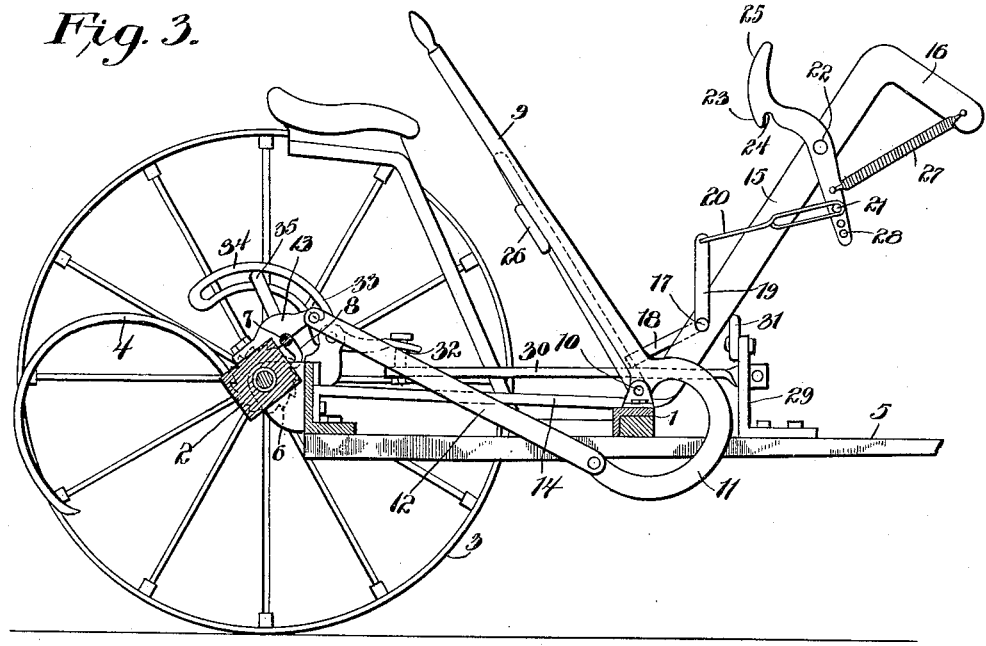
Figure 4:
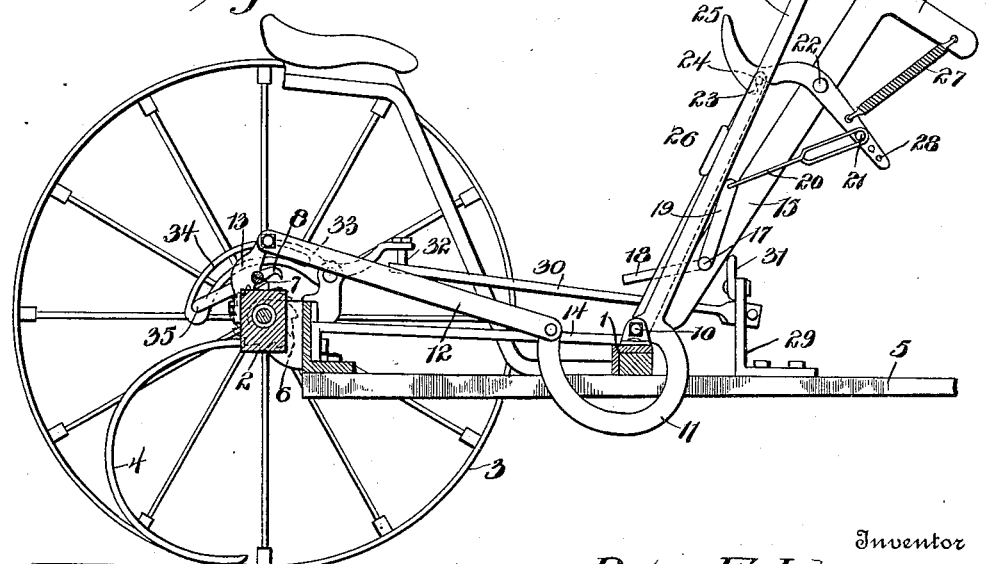

Figure 1 is a fragmentary perspective view of a rake showing the application of the invention. Fig. 2 is a top plan view of the same. Fig. 3 is a vertical longitudinal section on a line through the foot lever, showing the parts in dumping position. Fig. 4 is a similar view showing the parts in normal position.

Referring to the drawings, 1 designates the frame of the rake, 2 the axle, 3 the supporting wheels, 4 the rake proper, which is pivoted to the axle to swing in a vertical plane, 5 the draft tongue, 6 ratchet disks on the wheel hubs, and 7 a rock shaft journaled on the rake head and provided at its ends with dogs or pawls 8 to engage the ratchet disks, whereby power may be transmitted from the axle to elevate the rake.

9 designates the usual lever for the application of hand power to tilt the rake. This lever is pivotally coupled at its lower end, as at 10, to the frame and is provided with a crank member 11 connected by a link 12 with a crank member 13 on the rake head, whereby when the lever is swung forwardly the rake will be elevated to dumping position, and when the lever is swung rearwardly, said rake will be lowered to gathering position.

My invention provides a latch mechanism for holding the lever from movement and the rake in gathering position, and for shifting the dogs 8 into engagement with the ratchet disks for an automatic dumping action when desired.

Bolted or riveted to the frame is a bracket 14 provided with an upturned portion or standard 15, terminating at its upper end in a forwardly projecting arm 16. Pivoted to the standard is a trip lever 17, one of the arms of which forms a treadle or foot piece 18. The trip lever is pivoted to swing in a vertical plane and its other arm 19 is pivotally coupled to one end of a link 20, the opposite end of which is longitudinally slotted and engages a pin or stud 21 on the lower arm of an intermediately pivoted latch bar 22 mounted on the standard. The upper end of this latch bar carries a hooked latch 23 to engage a pin or stud 24 on the lever 9, whereby said lever and the dumping mechanism as a whole is normally locked in rake-depressing position. The latch is formed with an upwardly projecting cam member 25 having a beveled or curved guiding surface leading to the hook, and which is adapted to engage and ride in contact with the stud 22 when the lever 9 is returned after actuation to normal position, to guide said stud to the hook and adapted the latter to snap into engagement with the stud. The lever 9 is provided with a plate 26 against which one of the feet of the operator may be brought to bear to hold said lever in its normal position and to force it forwardly to assist in returning the rake to normal position after the load is dumped.

A coiled spring 27 is connected at one end with the lower end of the latch bar 22 and at its other end with the arm 16 of the standard 15. This spring is arranged in advance of the pivot point of the latch bar and exerts its contractile energy on the lower arm of said bar to throw the latch hook in locking position. The said lower arm of the latch bar is provided with a series of openings 28, to receive the pin or stud 21 and provided for the adjustable connection of the link 20 and spring 27 therewith at different distances from the pivot of the bar, whereby the throw of the link and latch projecting action of the spring may be regulated.

Rising from the tongue 5 is an upright 29, to the upper end of which is pivoted the forward end of a foot lever 30, and which upright is provided with a foot rest 31 notched to receive the toe of the foot, so that the heel thereof may be arranged to rest upon the foot piece 18 which overlies the lever 30, whereby through a downward pressure of the foot, the lever 17 may first be actuated to retract the latch bar 22 and release the dumping mechanism and downward motion thus imparted to the lever 30 to throw the automatic dumping means into action.

The rear end of the lever 30 is pivotally connected, as at 32, with the forward arm of a lever or crank 33 having a slotted rear arm 34 receiving and engaging a crank 35 on the rock shaft 7, the construction and arrangement being such that when the lever 30 is depressed, upward and forward motion will be imparted to the arm 34 and crank 35 to rock the shaft 7 forwardly. This forward rocking motion of the shaft 7 throws the dogs 8 into engagement with the ratchet disk 6, whereby the rake head will be locked to said disks and will turn forwardly with the axle, thus elevating the rake 4 to dumping position. When the lever 30 is released, the rake drops by gravity back to normal or gathering position and retracts the parts of the dumping mechanism. It will be understood, of course, that the operator may elevate the rake by means of the hand lever 9 alone or in connection with the automatic dumping mechanism, and may exert forward pressure upon the plate 26 to assist in returning the parts after dumping movement to normal position.

In practice one foot of the operator is arranged to rest against the plate 26 and the other upon the rest 31 and foot piece 18 as previously described, by which the lever 9 will be held against release in the event of casual depression of the part 18. When the lever 9 is swung forwardly to return the parts to normal position, the pin or stud 24 slides over the cam surface 25 of the latch bar 22 and automatically brings the hook 23 into engagement with said pin or stud, thus locking the parts in normal or gathering position.

I claim:

1. In a wheeled rake, the combination of a frame, a pivoted rake, means adapted to be thrown into action for moving the rake to dumping position under the action of the running gear, a lever, a connection between said lever and the rake whereby the latter may be manually operated, a crank movable to throw the first-named dumping means into and out of action, a depressible foot lever for controlling said crank, a latch device for holding the first named lever from movement, and a second foot lever disposed above the first named foot lever in position to be depressed simultaneously therewith for retracting said latch.

2. In a wheeled rake, the combination of a frame, a transverse axle pivotally mounted thereon, a rake carried by said axle, supporting wheels journaled on the axle and provided with ratchet members, a transverse crank shaft journaled on the axle and provided with dogs to engage said ratchet members, manually operable means, including a lever connected with the axle for tilting the same and adjusting the rake to dumping position, a latch device for holding said lever in normal position, a pivoted crank on the frame having a slotted arm engaging the crank of the crank shaft, for throwing said crank shaft in ratchet engaging position, a foot lever for operating said crank, and a second foot lever arranged above the first named foot lever and adapted to be depressed therewith, said second foot lever being connected with the latch whereby the latter may be retracted.

3. In a wheeled rake, the combination of a frame, a rake pivotally mounted thereon, normally inoperative means adapted to be operated by the running gear of the rake for moving the pivoted rake member to dumping position, said means including a crank shaft, means including a latch for normally holding the rake member in gathering position, a slotted crank engaging the crank shaft, a foot lever connected with the crank whereby the same may be operated to adjust said crank shaft, and a second foot lever arranged above and in position to be depressed simultaneously with the first named foot lever, said second named foot lever being connected with the latch whereby the latter may be retracted.

4. In a wheeled rake, the combination of a wheeled frame, a tilting rake member thereon, means, including a rock shaft, for throwing said rake into engagement with the running gear for tilting motion to dumping position, a crank for actuating the rock shaft, manually operable means, including a lever, for tilting the rake member, a pivoted latch for holding said lever in normal position, a spring for projecting the latch, a foot lever connected with the pivoted crank, a second foot lever arranged above and in proximity to the first named foot lever and provided with a crank arm, and a link connecting said crank arm with the latch.

In testimony whereof I affix my signature in presence of two witnesses.

PETER F. JOHANSON.

Witnesses:
W. T. RAMBO,
C. A. HALL.